US010936079B2

(12) United States Patent
Chang et al.

(10) Patent No.: US 10,936,079 B2
(45) Date of Patent: Mar. 2, 2021

(54) METHOD AND APPARATUS FOR INTERACTION WITH VIRTUAL AND REAL IMAGES

(71) Applicants: Industrial Technology Research Institute, Hsinchu (TW); Intellectual Property Innovation Corporation, Hsinchu (TW)

(72) Inventors: Chih-Chia Chang, Hsinchu County (TW); Yu-Hsin Lin, Miaoli County (TW); Pi-Hsien Wang, Hsinchu (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 0 days.

(21) Appl. No.: 16/252,717

(22) Filed: Jan. 21, 2019

(65) Prior Publication Data
US 2020/0089323 A1 Mar. 19, 2020

(30) Foreign Application Priority Data
Sep. 17, 2018 (TW) .................................. 107132575

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0101* (2013.01); *G06F 3/012* (2013.01);
(Continued)

(58) Field of Classification Search
CPC .......... G06F 3/017; G06F 3/012; G06F 3/013; G06F 3/033; G06F 3/0488;
(Continued)

(56) References Cited

U.S. PATENT DOCUMENTS

| 8,466,894 B2 | 6/2013 | Sugita et al. |
| 9,317,113 B1 | 4/2016 | Karakotsios et al. |

(Continued)

FOREIGN PATENT DOCUMENTS

| CN | 102402287 | 4/2012 |
| CN | 102866835 | 1/2013 |

(Continued)

OTHER PUBLICATIONS

"Office Action of Taiwan Counterpart Application," dated Aug. 29, 2019, p. 1-p. 10.
(Continued)

*Primary Examiner* — Afroza Chowdhury
(74) *Attorney, Agent, or Firm* — JCIPRNET

(57) ABSTRACT

A method and an apparatus for interaction with virtual and real images are provided. The method includes following steps: detecting a pointing operation of a user for the transparent display and determining whether the pointing operation triggers the transparent display by a processor; if the pointing operation triggers the transparent display, determining whether prompt information is presented at a trigger location of the pointing operation on the transparent display; if the prompt information is presented, interacting with the prompt information; and if the prompt information is not presented, interacting with an object on a side of the transparent display opposite to a user pointed by the pointing operation.

20 Claims, 11 Drawing Sheets

(51) Int. Cl.
*G06F 3/033* (2013.01)
*G06F 3/0488* (2013.01)
*G06K 9/00* (2006.01)

(52) U.S. Cl.
CPC .............. *G06F 3/013* (2013.01); *G06F 3/033* (2013.01); *G06F 3/0488* (2013.01); *G06K 9/00624* (2013.01); *G02B 2027/014* (2013.01); *G02B 2027/0138* (2013.01)

(58) Field of Classification Search
CPC ........ G02B 27/0101; G02B 2027/0138; G02B 2027/014; G06K 9/00624
See application file for complete search history.

(56) References Cited

U.S. PATENT DOCUMENTS

| | | |
|---|---|---|
| 9,558,590 B2 | 1/2017 | Westerinen et al. |
| 2012/0072873 A1 | 3/2012 | Park et al. |
| 2015/0253930 A1 | 9/2015 | Kozloski et al. |
| 2017/0123491 A1* | 5/2017 | Hansen ................. G06F 3/012 |
| 2018/0307304 A1* | 10/2018 | Bronder ................. A63F 13/25 |

FOREIGN PATENT DOCUMENTS

| | | |
|---|---|---|
| CN | 104246664 | 12/2014 |
| CN | 104820497 | 8/2015 |
| CN | 107226027 | 10/2017 |
| CN | 108268204 | 7/2018 |
| TW | 201347702 | 12/2013 |
| TW | M488933 | 11/2014 |
| TW | 201708881 | 3/2017 |
| TW | 201833727 | 9/2018 |

OTHER PUBLICATIONS

"Office Action of China Counterpart Application", dated Oct. 9, 2020, p. 1-p. 10.

* cited by examiner

METHOD AND APPARATUS FOR INTERACTION WITH VIRTUAL AND REAL IMAGES

CROSS REFERENCE TO RELATED APPLICATION

This application claims the priority benefit of Taiwan application serial no. 107132575, filed on Sep. 17, 2018. The entirety of the above-mentioned patent application is hereby incorporated by reference herein.

BACKGROUND

Technical Field

The disclosure relates to an information display method and apparatus, and also relates to an interactive method and apparatus for virtual and real images.

Description of Related Art

According to their technical principles, transparent displays may be classified into transmission transparent displays and projection transparent displays. Among them, transmission transparent displays make the display panels transparent and the projective transparent displays use the projection method to project the images onto the reflective and transparent substrates to achieve the transparent display effect.

The transparent displays have the characteristics of transparency, lightness and thinness, and the capability of combining the virtual images displayed on the display with the scenes of the real world to give the viewers a perceptive and an intuitive interactive experience. Not only the viewers can see the physical object through the transparent display but also can see the information superimposed on or displayed around the physical object on the transparent display, and can even interact with the display information on the transparent display through the touch technology.

Transparent displays have been widely introduced into applications such as vehicle head-up displays, vending machines, merchandise windows, museum exhibits, and sightseeing vehicle tours. In the case where a user views an object located on another side of a transparent display with respect to the user, if the virtual object displayed on the transparent display also appears on or around the line of sight of the user, the transparent display at this time may overlap the object information displayed by the object and the virtual object, which may cause information muddling and confusion for the users.

For example, FIG. 1 is a schematic diagram of a display of object information. Referring to FIG. 1, when a user 10 views an object 14 on another side of a transparent display 12 with respect to the user, and a virtual object 16 is displayed on the transparent display 12 also appears in a line of sight of the user 10, the transparent display at this time will overlap the object information 14a and 16a displayed for the object 14 and the virtual object 16. This would cause information muddling for the user, and the object indicated by the object information 14a and 16a would not be clearly distinguished.

SUMMARY

An embodiment of the disclosure provides an interactive method of virtual and real images, including the following steps: a processor detecting a pointing operation of a user on the transparent display, and determining whether the pointing operation triggers the transparent display; if the transparent display is triggered, determining whether there is prompt information at a trigger location of the pointing operation on the transparent display; if the prompt information is present, interacting with the prompt information; and if the prompt information is not present, interacting with the object pointed to by the pointing operation located on another side of the transparent display with respect to the user.

An embodiment of the disclosure provides an interactive apparatus for virtual and real images, which includes a transparent display, a first information capturing device, a second information capturing device, and a processor. The first information capturing device is used to capture external object information on another side of the transparent display with respect to a user viewing the transparent display. The second information capturing device is used to capture user's information. The processor is coupled to the transparent display, the first information capturing device and the second information capturing device for loading and executing a plurality of program commands to: detect a pointing operation of the user on the transparent display by using the captured user information, and determine whether the pointing operation triggers the transparent display; if the transparent display is triggered, determine whether there is prompt information at a trigger location of the pointing operation on the transparent display; if the prompt information is present, interact with the prompt information; and if the prompt information is not present, interact with the object pointed to by the pointing operation located on the other side of the transparent display with respect to the user.

In order to make the disclosure more apparent, the following detailed description of the embodiments and the accompanying drawings are set forth below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, explain the principles of the disclosure.

DESCRIPTION OF THE EMBODIMENTS

An embodiment of the disclosure detects a pointing operation of a user and determines whether it generates a triggering behavior on the transparent display. When the triggering behavior is detected, according to whether prompt information exists at a trigger location to determine a subsequent interactive method. If the prompt information is present at the trigger location, it is presumed that the user wants to interact with the prompt information, so an interaction is performed for the prompt information; otherwise, if the prompt information is not present at the trigger location, it is presumed the user wants interact with the object on the other side of the transparent display with respect to the user, so the object is interacted with. Thereby, not only may the interactive operation of the user be correctly reflected, but the user's confusion toward information displayed on the transparent display may also be prevented.

Figure 1:
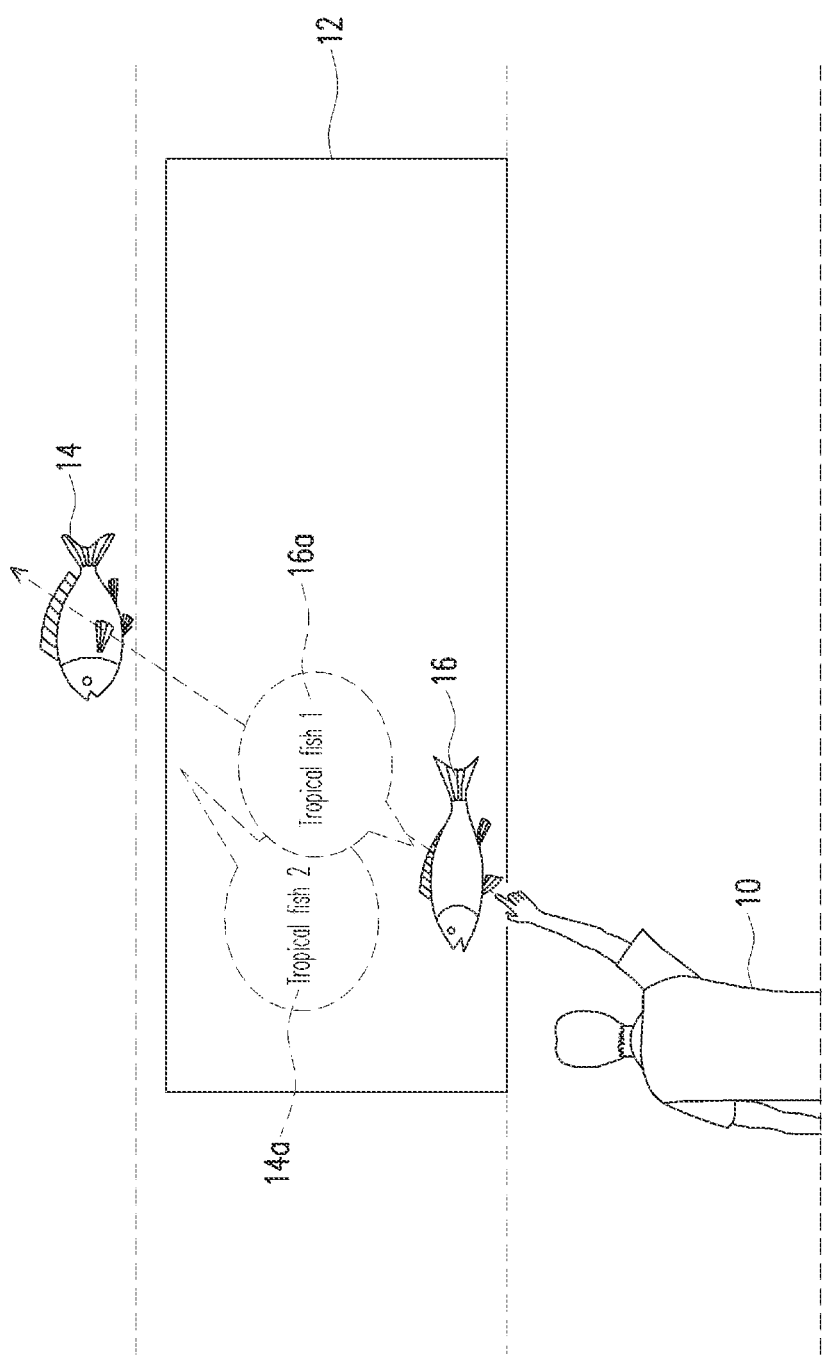
FIG. 1 is a schematic diagram showing object information.
Figure 2:
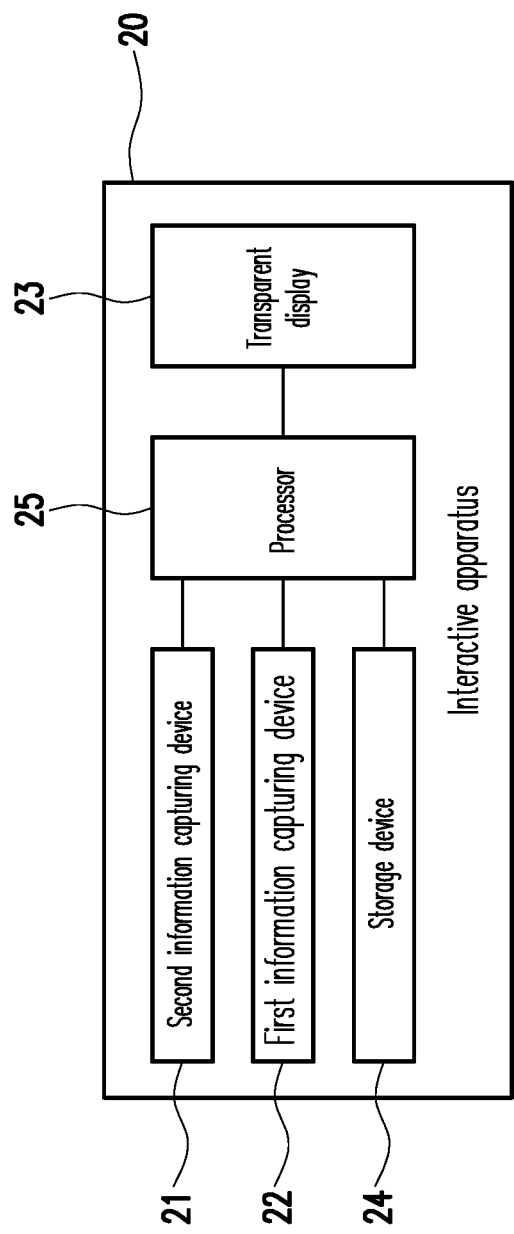
FIG. 2 is a block diagram of an interactive apparatus for virtual and real images according to an embodiment of the disclosure.

FIG. 2 is a block diagram of an interactive apparatus for virtual and real images according to an embodiment of the disclosure. Referring to FIG. 2, the interactive apparatus 20 of virtual and real images of the embodiment is, for example, an electronic apparatus having a transparent display function, which includes a second information capturing device 21, a first information capturing device 22, a transparent display 23, a storage device 24, and a processor 25. The second information capturing device 21 is configured to capture user's information, such as a pointing direction. The pointing direction may also be obtained by the image sensor detecting the line of sight direction, the pointing direction of a remote controller, and a pointing behavior such as the direction of the touch and the eyeball projection; it is not limited to the pointing behavior of the user in the image captured by the camera. The first information capturing device 22 is used for identifying the position of an external object, and may also be used for positioning objects through the network communication device, such as identification and positioning of objects such as Bluetooth transmitters and receivers, and is not limited to the pointing behavior of the user in the images captured by cameras.

In an embodiment, the second information capturing device 21 and the first information capturing device 22 respectively include a lens and an image sensor, wherein the lens may be composed of a plurality of meniscus lenses and are driven by an actuator such as a stepping motor or a voice coil motor to change the relative position between the lenses, thereby changing the focal length of the lens so that the subject may be imaged on the image sensor. The image sensor, provided with a charge coupled device (CCD), a complementary metal-oxide semiconductor (CMOS) component or other kinds of photosensitive elements, may sense the light intensity entering the lens, thereby capturing the image signal to generate and output the image. In this embodiment, the second information capturing device 21 is configured to capture an internal image of a user viewing the transparent display 23, and the first information capturing device 22 is configured to capture the external objection information on the other side of the transparent display 23 with respect to the user. In another embodiment, the second information capturing device 21 and the first information capturing device 22 may also include a programmable processing unit, a microprocessor, an application specific integrated circuits (ASICs), a programmable logic device (PLD), or other similar circuit components to perform the function of identifying the object, and the disclosure is not limited thereto.

The transparent display 23 is a display with a certain degree of light transmittance and may present the background on the other side of the display with respect to the user, such as a thin film transistor liquid crystal display (TFT-LCD), a field sequential color display, an active matrix organic light emitting display (AMOLED), an electrowetting display, or other transmission or projection transparent display. In addition to the transparent display panel being see-through and able to display information, the transparent display 23 may also be integrated with the touch panel that detects the user's touch operations to provide interaction between the user and the display information.

The storage device 24 may be any type of a fixed or a removable random access memory (RAM), a read-only memory (ROM), a flash memory or a similar component or a combination of the above components. In the embodiment, the storage device 24 stores the image data captured by the second information capturing device 21 and the first information capturing device 22, and stores the identification data obtained by the processor 25 to identify the object in the image and record computer programs or instructions that are accessible and executable by processor 25.

The processor 25 is, for example, a central processing unit (CPU), or other programmable general purpose or special purpose microprocessor, digital signal processor (DSP) programmable controller, an application specific integrated circuit (ASIC), a programmable logic device (PLD), or other similar device or a combination of these devices. The processor 25 is coupled to the second information capturing device 21, the first information capturing device 22, the transparent display 23, and the storage device 24, and may, for example, load the program commands from the storage device 24 and execute the interactive method of virtual and real images according to the embodiment of the disclosure. In other embodiments, the interactive apparatus 20 may further include a communication module for communicating with the external apparatus, an eye tracing device for tracking the user's eyeballs viewing the transparent display 23, etc., this embodiment does not limit the types of component. The following is a detailed description of the detailed steps of the interactive method of virtual and real images of the disclosure.

Figure 3:
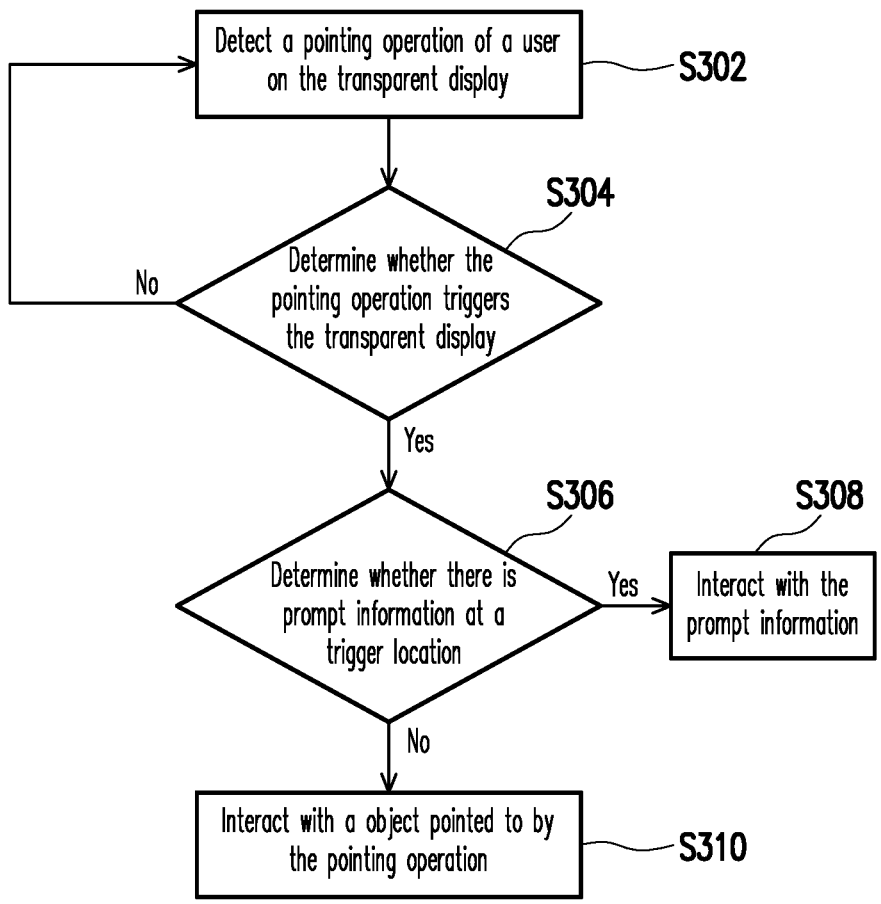
FIG. 3 is a flowchart of an interactive method of virtual and real images according to an embodiment of the disclosure.

FIG. 3 is a flowchart of an interactive method of virtual and real images according to an embodiment of the disclosure. Referring to FIG. 2 and FIG. 3 at the same time, the method of the embodiment may be applied to the interactive apparatus 20 of FIG. 2, and the detailed steps of the interactive method of virtual and real images of the disclosure are described below with the components in the interactive apparatus 20.

First, the processor 25 detects a pointing operation of a user on the transparent display 23 (step S302). In an embodiment, the processor 25 may use the second information capturing device 21 to capture an image of the user viewing the transparent display 23, and to determine whether the user's line of sight points to the transparent display 23 by identifying the positions of user's eyeballs in the image. In an embodiment, the processor 25 may also be configured with an eye tracking device in addition to detect the angle of the user's eyes to determine if the line of sight of the user is pointing to the transparent display 23. In an embodiment, the processor 25 may determine the pointing operation of the user on the transparent display 23 by identifying the user's gesture in the image or a pointing direction of a pointing device (for example, an infrared emitter) held by the user. In an embodiment, the processor 25 may also determine the pointing operation of the user on the transparent display 23 from an image of the user captured by the second information capturing device 21. This embodiment does not limit the method to detecting the pointing operation. In an embodiment, the pointing operation may be obtained by the image sensor detecting the line of sight direction, the pointing direction of the remote controller, the pointing behavior such as the direction of the touch and the eyeball projection, and is not limited to the pointing behavior of the user image captured by the camera.

Next, the processor 25 may determine whether the detected pointing operation triggers the transparent display 23 (step S304). In an embodiment, the processor 25 may detect a user's touch (such as a finger, a stylus, or other object) on the transparent display 23 by the touch panel configured to trigger the transparent display 23 to determine whether the pointing operation of the user triggers the transparent display 23. In an embodiment, the processor 25 may determine whether the user's pointing operation triggers the transparent display 23 by determining whether the line of sight of the user stays on the transparent display 23 or whether the time at which the handheld pointing device points to the transparent display 23 exceeds a preset time. The trigger location is determined to be the position where the line of sight stays on the transparent display 23 or the location where the handheld points toward on the transparent display 23. This embodiment does not limit the method to determining how the transparent display 23 is triggered.

If the pointing operation does not trigger the transparent display 23, the flow returns to step S302, and the processor 25 continues to detect the pointing operation. On the other hand, if the pointing operation triggers the transparent display 23, the processor 25 determines whether prompt information is present at a trigger location of the pointing operation on the transparent display 23 (step S306).

If the prompt information present at the trigger location, in confirming that the user wants to interact with the prompt information, the processor 25 may interact with the user with the prompt information (step S308). In an embodiment, the prompt information is, for example, an icon or a text, and when the processor 25 determines that the pointing operation of the user triggers the icon or the text, for example, a corresponding function of the icon may be activated, or the next level of information or other information in the icon or the text may be displayed to interact with the user. This embodiment does not limit the method of interacting with the prompt information.

On the other hand, if there is no prompt information at the trigger location, in confirming that the user wants to interact with the object on the other side of the transparent display 23 with respect to the user, the processor 25 at this time may interact with the object pointed to by the pointing operation located on the other side of the transparent display 23 with respect to the user (step S310). In an embodiment, the processor 25 determines whether there is an object in the direction pointed by the pointing operation and identifies the object to display object information of the object at or around the trigger location on the transparent display 23 when the object's presence is confirmed.

In the above embodiment, the object that the user wants to interact with may be confirmed according to whether the pointing operation of the user triggers the prompt information displayed on the transparent display, so that only the object is interacted with, thereby preventing the user from being confused by the information displayed on the transparent display 23.

In an embodiment, when the interactive apparatus 20 determines that the user wants to interact with the object on the other side of the transparent display 23 with respect to the user, for example, the trigger location of the pointing operation on the transparent display 23 and the position of the face/eye may be combined to confirm the object that the user wants to interact with.

Figure 4:
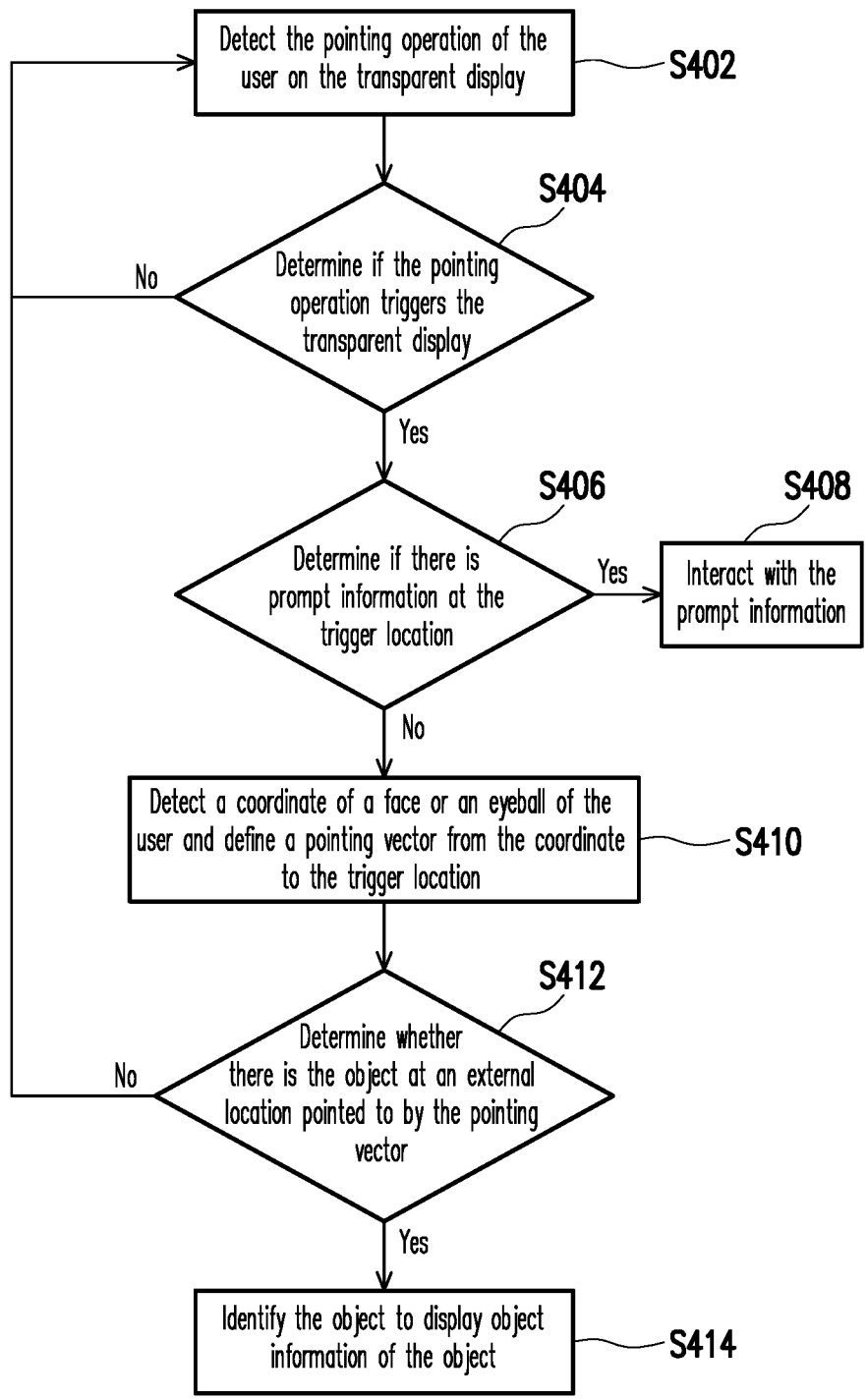
FIG. 4 is a flowchart of an interactive method of virtual and real images according to an embodiment of the disclosure.

For example, FIG. 4 is a flowchart of an interactive method of virtual and real images according to an embodiment of the disclosure. Referring to FIG. 2 and FIG. 4 at the same time, the method of this embodiment may be applied to the interactive apparatus 20 of FIG. 2, and the steps are as follows:

First, the processor 25 detects the pointing operation of the user on the transparent display 23 (step S402). Next, the processor 25 may determine whether the detected pointing operation triggers the transparent display 23 (step S404). If the pointing operation does not trigger the transparent display 23, the flow returns to step S402, and the processor 25 continues to detect the pointing operation. On the other hand, if the pointing operation triggers the transparent display 23, the processor 25 may determine whether there is prompt information at the trigger location of the pointing operation on the transparent display 23 (step S406). If the prompt information is present at the trigger location, in confirming that the user wants to interact with the prompt information, the processor 25 at this time may interact with the user with the prompt information (step S408). The steps S402 to S408 above are the same as or similar to the steps S302 to S308 of the foregoing embodiment, thus the details thereof are not described herein again.

In this embodiment, if the prompt information is not present at the trigger location, the processor 25 may detect the coordinates of the user's face or eyeballs and define a pointing vector from the coordinate to the trigger location (step S410) to determine whether or not there is the object at an external location pointed to by the pointing vector on another side of the transparent display 23 with respect to the user (step S412). That is to say, in this embodiment, the object that the user is looking at may be found when the line of sight of the user are simulated by connecting the user's face or eyeballs to the trigger location of the pointing operation, and extending the connection (i.e., the pointing vector) to the other side of the transparent display 23 with respect to the user.

If the object is present at the external location pointed to by the pointing vector, in confirming that the object is an object that the user wants to interact with, the processor 25 at this time may identify the object to display object information of the object on the transparent display 23 (step S414). On the other hand, if the object is not present at the external location pointed to by the vector, the flow returns to step S402, and the processor 25 continues to detect the pointing operation.

In an embodiment, the interactive apparatus 20, when interacting with the prompt information, for example, continuously tracks whether the pointing operation of the user repeatedly triggers the transparent display 23 to determine whether the user wants to continue or end the interaction.

Figure 5:
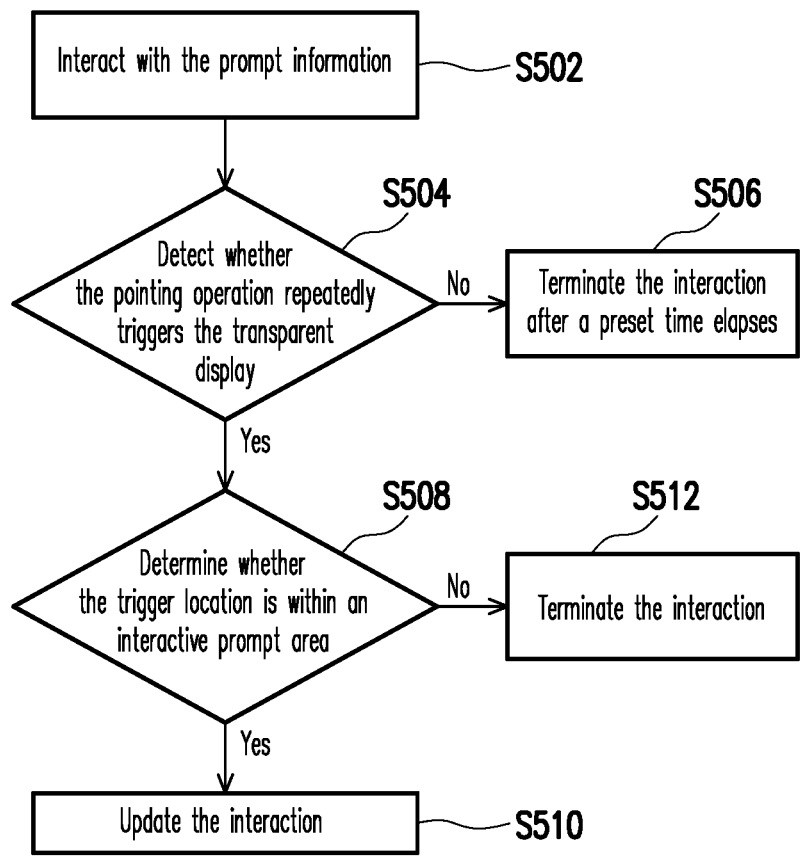
FIG. 5 is a flowchart of an interactive method of virtual and real images according to an embodiment of the disclosure.

For example, FIG. 5 is a flowchart of an interactive method of the virtual and the real images according to an embodiment of the disclosure. Referring to FIG. 2 and FIG. 5 at the same time, the method of this embodiment is continued after step S308 of FIG. 3, and the steps are as follows:

While interacting with the prompt information displayed at the trigger location (step S502), the processor 25 continuously detects whether the pointing operation of the user repeatedly triggers the transparent display 23 (step S504). The method of detecting whether the pointing operation triggers the transparent display 23 may be the same as or similar to the step S304 in the foregoing embodiment and details thereof are not described herein again.

If a repeated trigger is not detected, the processor 25 may terminate the interaction after a preset time elapses (step S506). In an embodiment, the processor 25 considers factors such as the form of interaction (picture, video, text), the text size of the interactive information, the moving speed and other factors, and calculates the time suitable for the human eyes to comfortably read the text or its content in full. The length of time is, for example, between 0.2 and 0.5 seconds/word, so that after the time has elapsed, the display of the interactive information is terminated to return to the previously displayed prompt information or stop displaying the prompt information.

If a repeated trigger is detected, the processor 25 may continue to determine whether the trigger location of the repeatedly triggered pointing operation on the transparent display 23 is within an interactive prompt area (step S508). If the trigger location is within the interactive prompt area, indicating the user continues to interact, the processor 25 updates the interaction (step S510). That is, the processor 25 displays the next set of information of the interaction or displays the interactive effect, and the embodiment does not limit the mode of interaction.

On the other hand, if the trigger location is not in the interactive prompt area, indicating the user no longer wants to interact, the processor 25 may terminate the interaction (step S512). In an embodiment, the processor 25, for example, directly terminates the display of interactive information and returns to the previously displayed prompt information or stops displaying any information.

In an embodiment, the interactive apparatus 20 pre-identifies the object appearing on the other side of the transparent display 23 with respect to the user, so when the user points to the object, the object information is immediately displayed, thus a pause from a real time identification may be prevented.

Figure 6:
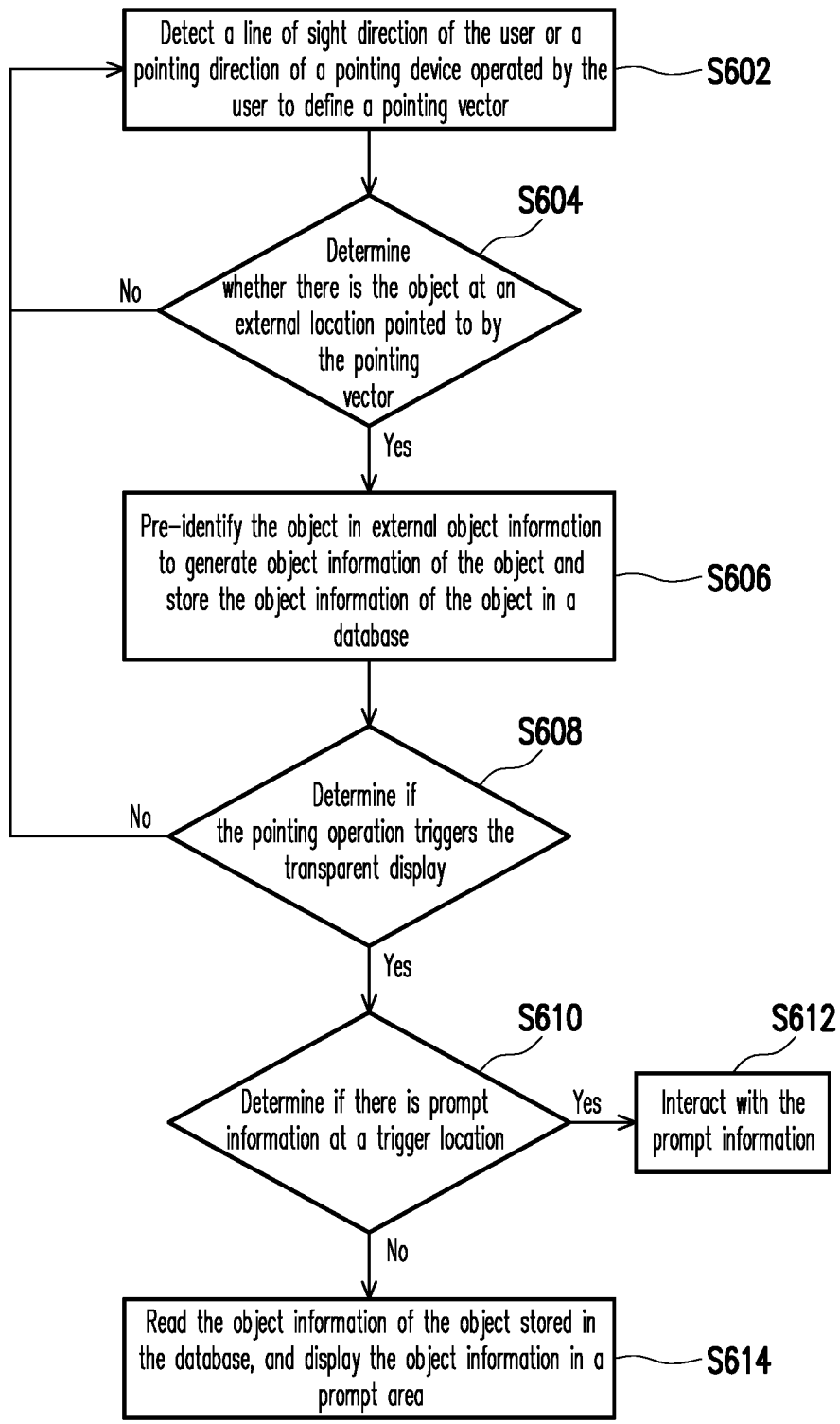
FIG. 6 is a flowchart of an interactive method of virtual and real images according to an embodiment of the disclosure.

For example, FIG. 6 is a flowchart of an interactive method of virtual and real images according to an embodiment of the disclosure. Referring to FIG. 2 and FIG. 6 at the same time, the method of this embodiment may be applied to the interactive apparatus 20 of FIG. 2, and the steps are as follows:

First, the processor 25 may detect a line of sight direction of the user or a pointing direction of the pointing device operated by the user to define a pointing vector (step S602). As described in the foregoing embodiment, the processor 25 determines the line of sight of the user by identifying the positions of the user's eyeballs in the image captured by the second information capturing device 21, by determining the angles of the user's eyeballs by the eye tracing device to determine the line of sight of the user, or by identifying the pointing direction of the user's handheld in the image to determine the direction, thereby defining a pointing vector. This embodiment does not limit the definition of the pointing vector.

Next, the processor 25 may determine whether there is the object at the external location pointed to by the pointing vector on other side of the transparent display 23 with respect to the user (step S604). Wherein, if the object is not present at the external location pointed to by the vector, the flow returns to step S602 to continue detecting and defining the pointing vector. If the object is present at the external location pointed to by the pointing vector, the processor 25 may pre-identify the object in external object information on the other side of the transparent display 23 with respect to the user captured by the first information capturing device 22. Object information of the object is generated and stored in a database in the storage device 24 (step S606).

Then, the processor 25 may continue to determine whether the pointing operation of the user triggers the transparent display 23 (step S608). If the pointing operation does not trigger the transparent display 23, the flow returns to step S602, where the processor 25 continues to detect and define the pointing vector. On the other hand, if the pointing operation triggers the transparent display 23, the processor 25 may determine whether there is prompt information at a trigger location of the pointing operation on the transparent display 23 (step S610). If the prompt information is present at the trigger location, in confirming that the user wants to interact with the prompt information, the processor 25 at this time may interact with the user with the prompt information (step S612). The steps S608 to S612 above are the same as or similar to the steps S304 to S308 of the foregoing embodiment, and thus the details thereof are not described herein again.

In this embodiment, if the prompt information is not present at the trigger location, in confirming that the user wants to interact with the object on the other side of the transparent display 23 with respect to the user, pertaining to the object pointed to by the pointing operation located on the other side of the transparent display with respect to the user, the processor 25 may read the object information of the object stored in the database and display the object information in a prompt area on the transparent display 23 (step S614). In an embodiment, assuming the object located on the other side of the transparent display 23 with respect to the user is a static object, the processor 25 at this time may use the object pointed by the pointing vector previously as an object pointed by the pointing operation, so that the stored object information is directly obtained from the database for display. In an embodiment, assuming the object located on the other side of the transparent display 23 with respect to the user is a dynamic object, the processor 25 may again determine whether there is the object at an external location pointed to by the pointing vector, and when it is determined the object is present, using an identifiable feature to determine whether the object and the previously determined object are the same, the previously stored object information is read and displayed from the database according to the determination result.

In an embodiment, the interactive apparatus 20, when interacting with the prompt information, for example, tracks the subsequent behavior of the user for the interaction to determine whether to terminate the interaction or change the mode of interaction.

Figure 7:
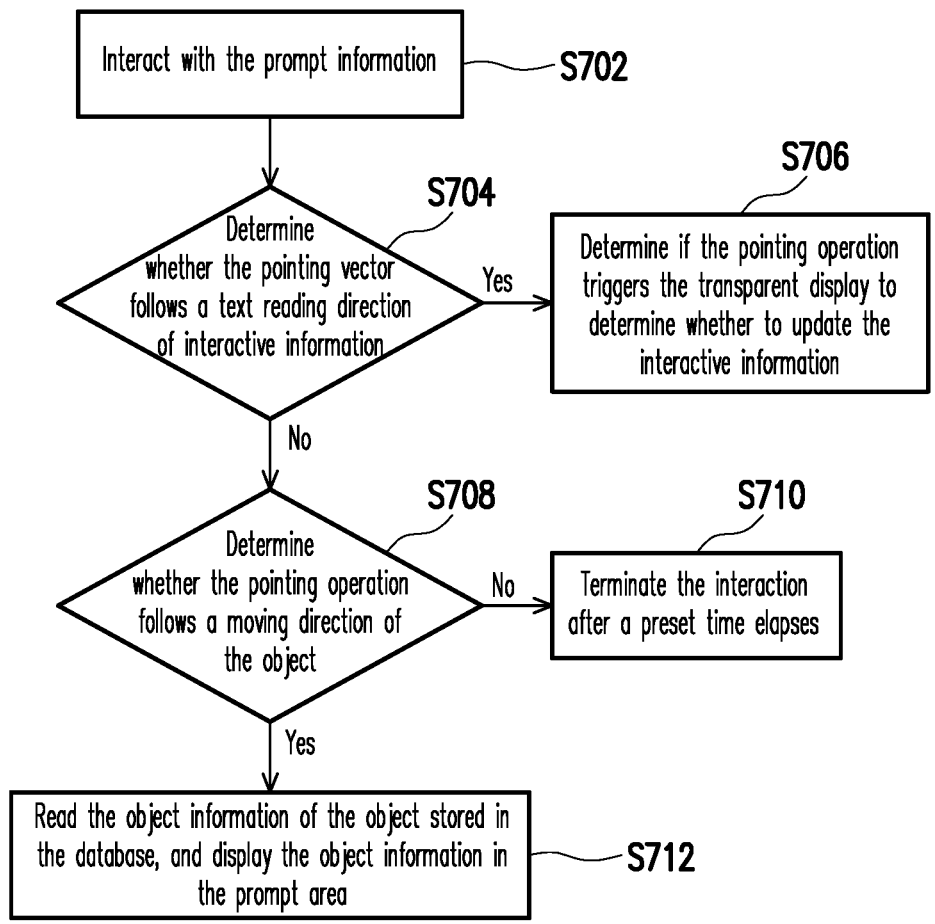
FIG. 7 is a flowchart of an interactive method of virtual and real images according to an embodiment of the disclosure.

For example, FIG. 7 is a flowchart of an interactive method of virtual and real images according to an embodiment of the disclosure. Referring to FIG. 2 and FIG. 7 at the same time, the method of this embodiment is a continuation of step S612 of FIG. 6, and the steps are as follows:

The processor 25 may track the pointing vector of the user while interacting with the prompt information displayed at the trigger location (step S702), and determine whether the pointing vector follows a text reading direction of interactive information generated by the interaction (step S704). In the embodiment, assuming the method in which the processor 25 interacts with the prompt information is by displaying interactive information, the interactive information may include a string of text, and is displayed at or around the trigger location according to a text reading direction (i.e., horizontally to the right or vertically downward). Accordingly, if it is determined that the pointing vector of the user (the line of sight direction or the pointing direction of the pointing device) follows the reading direction of the text, it is presumed the user is reading the interactive information, the processor 25 at this time may continue to determine whether the pointing operation triggers the transparent display 23 to decide whether to update the interactive information (step S706).

On the other hand, if the pointing vector does not follow the text reading direction of the interactive information, the processor 25 may continue to determine whether the pointing operation follows a moving direction of the object (step S708). Wherein, if the pointing vector does not follow the moving direction of the object, it is presumed that the user is not focused on the interactive information and/or the object, the processor 25 terminates the interaction after a preset time elapses (step S710).

If the pointing vector follows the moving direction of object, it is presumed the user is focused on the object, the processor 25 at this time may read the object information of the object stored in the database, and display the object information in the prompt area (step S712). Step S712 is the same as or similar to step S614 in FIG. 6, and the details thereof are not described herein again.

By the above method, the interactive apparatus 20 may perform an interactive operation (update interactive information, terminate the interaction or the display of the object information) by tracking the object that the user is focused on.

In an embodiment, the interactive apparatus 20 may support interactive operations of multiple users. That is, the interactive apparatus may also detect the interacting behavior of other users while interacting with the current user, thereby determining whether to change the mode of interaction for the current user.

Figure 8:
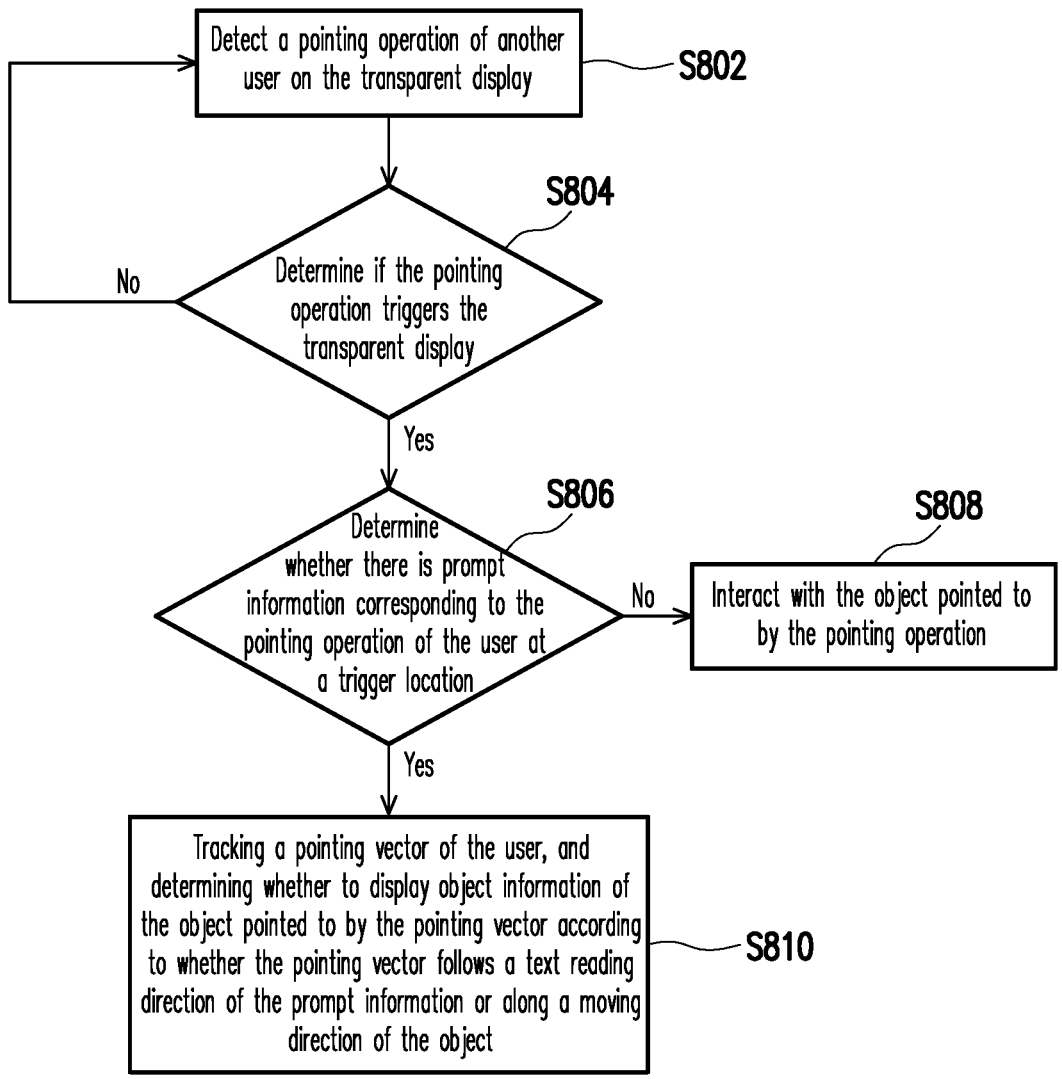
FIG. 8 is a flowchart of an interactive method of virtual and real images according to an embodiment of the disclosure.

For example, FIG. 8 is a flowchart of an interactive method of virtual and real images according to an embodiment of the disclosure. Referring to FIG. 2 and FIG. 8 at the same time, the method of this embodiment may be applied to the interactive apparatus 20 of FIG. 2, and the steps are as follows:

First, the processor 25 detects a pointing operation of another user on the transparent display 23 (step S802), and determines whether the detected pointing operation of the other user triggers the transparent display 23 (step S804). If the pointing operation of the other user does not trigger the transparent display 23, the flow returns to step S802 to continue detecting or tracking the pointing operation of the other user.

If the pointing operation of the other user triggers the transparent display 23, the processor 25 may determine whether the trigger location has the prompt information corresponding to the pointing operation of current user according to the trigger location of the pointing operation of the other user on the transparent display 23 (step S806). If the prompt information is not present at the trigger location, the processor 25 may interact with the object pointed to by the pointing operation of the other user located on the other side of the transparent display 23 with respect to the user (step S808), for example, the object may be identified to display object information of the object on the transparent display 23.

If the above prompt information is present at the trigger location, the interacting behavior of the current user may be further tracked to decide how to perform subsequent interaction. In detail, the processor 25 will track a pointing vector of the current user, and according to whether the pointing vector follows a text reading direction of the prompt information and/or whether it follows a moving direction of the object, to determine whether to display object information of the object pointed to by the pointing vector (step S810). In an embodiment, when the processor 25 determines that the pointing vector of the current user follows the text reading direction of the prompt information, in determining the current user still interacts with the prompt information, the processor 25 no longer tracks the triggering behavior of the pointing operation of the other user and interacts with the current user. In an embodiment, when the processor 25 determines that the pointing vector of the current user follows the moving direction of the object, in determining the current user interacts with the object, the processor 25 displays the object information of the object pointed to by the pointing vector on the transparent display 23. In an embodiment, when the processor 25 determines that the pointing vector of the current user does not follow the text reading direction of the prompt information or the moving direction of the object, in determining that the current user has no interactive behavior for the prompt information or the object, the processor 25 at this point my terminate the display of the prompt information from prevent the prompt information from obstructing a line of sight of another user for viewing an object.

In an embodiment, the interactive apparatus 20 may display an object cue point on the transparent display 23 at a position of an object where the line of sight of the user falls, so that the user may establish interactive behavior by touching the object cue point.

Figure 9:
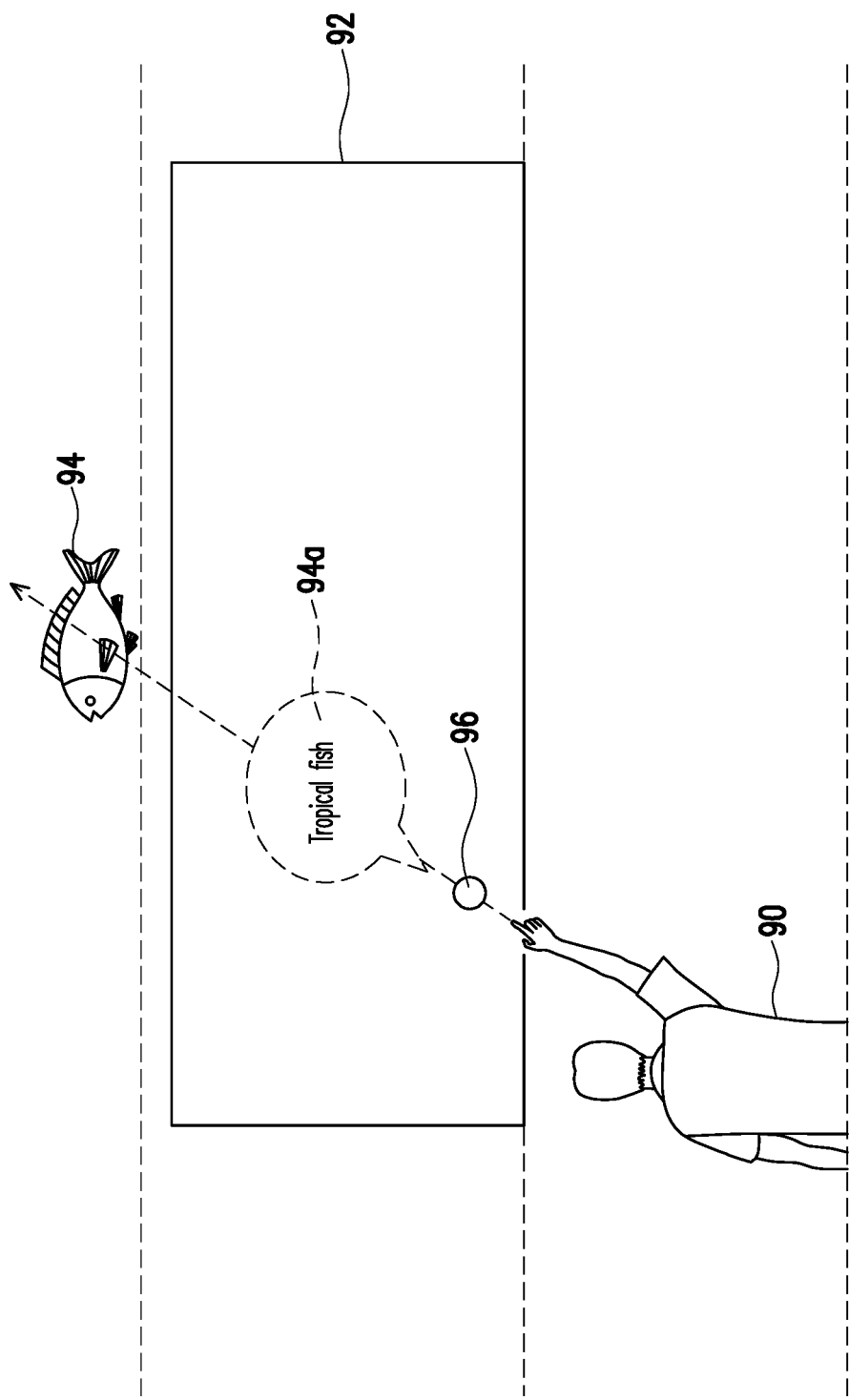
FIG. 9 is a schematic diagram of an interactive method of virtual and real images according to an embodiment of the disclosure.

For example, FIG. 9 is a schematic diagram of an interactive method of virtual and real images according to an embodiment of the disclosure. Referring to FIG. 9, in the embodiment, when a user 90 views an object 94 on another side of the transparent display 92 with respect to the user, the object cue point 96 is displayed at the position where this line of sight of the user 90 falls on the transparent display 92 according to the direction of the line of sight of the user 90 to the object 94. When the user to touch the object cue point 96, the transparent display 92 displays the object information 94a of the object 94.

Figure 10:
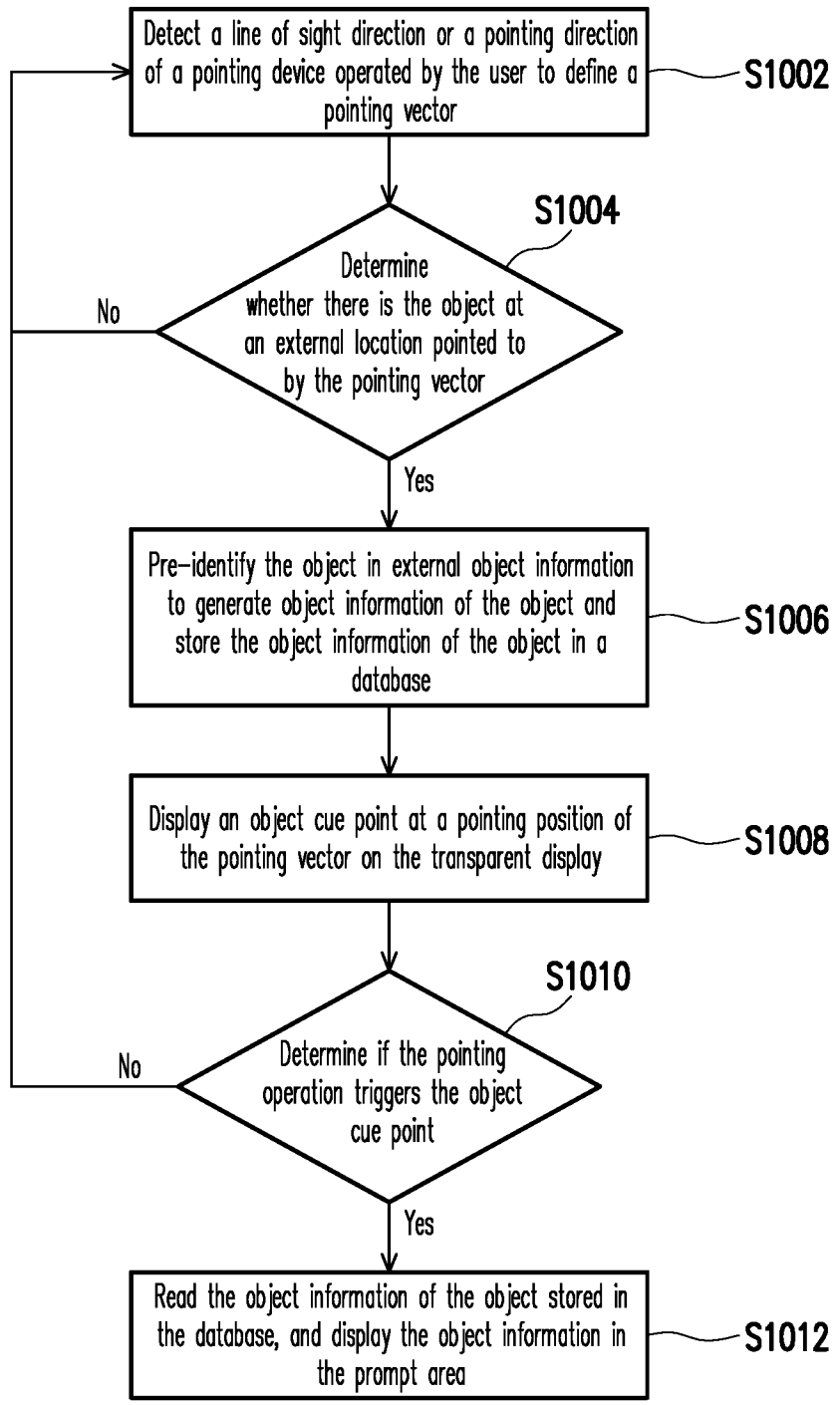
FIG. 10 is a flowchart of an interactive method of virtual and real images according to an embodiment of the disclosure.

FIG. 10 is a flowchart of an interactive method of virtual and real images according to an embodiment of the disclosure. Referring to FIG. 2 and FIG. 10 at the same time, the method of this embodiment may be applied to the interactive apparatus 20 of FIG. 2, and the steps are as follows:

First, the processor 25 may detect a line of sight direction of the user or a pointing direction of a pointing device operated by the user to define a pointing vector (step S1002). Next, the processor 25 may determine whether there is the object at an external location pointed to by the pointing vector on another side of the transparent display 23 with respect to the user (step S1004). Wherein, if the object is not present at the external location pointed to by the vector, the flow returns to step S1002 to continue detecting and defining the pointing vector. If the object is present at the external location pointed to by the pointing vector, the processor 25 may pre-identify the object in external object information on the other side of the transparent display 23 with respect to the user captured by the first information capturing device 22, and generate the object information of the object and store in the database in the storage device 24 (step S1006). The above steps S1002 to S1006 may be the same as or similar to the steps S602 to S606 of the foregoing embodiment, and thus the details thereof are not described herein again.

In the embodiment, after defining the pointing vector, the processor 25 also displays an object cue point at a pointing position of the pointing vector on the transparent display 23 (step S1008). The object cue point is, for example, a specific graphic or illustration that is easy for the user to recognize and operate, and may be displayed on the transparent display 23 around the display information, and facilitate the user to interact with the existing display information.

Then, the processor 25 may determine whether the pointing operation of the user triggers the object cue point (step S1010). If it is determined that the pointing operation of the user does not trigger the object cue point, the process returns to step S1002 to continue detecting and defining the pointing vector.

If it is determined that the pointing operation of the user triggers the object cue point, in determining the user wants to interact with the object, the processor 25 at this time may read the object information of the object stored in the database and display the object information in the prompt area on the transparent display 23 (step S1012).

In an embodiment, if it is determined in the above step S1010 that the pointing operation of the user does not trigger the object cue point, then before performing step S1012, the processor 25 may additionally determine whether there is prompt information at the trigger location of the pointing operation on the transparent display 23. If the prompt information is present, the processor 25 may interact with the user through the prompt information. On the other hand, if the prompt information is not present, the processor 25 reads the object information of the object stored in the database, and displays the object information in the prompt area on the transparent display 23.

In an embodiment, the interactive apparatus 20, in determining the user wants to interact with the object (i.e., the pointing operation triggers the object cue point), identifies the object, and generates and displays the object information, thereby saving resources for real time identification of the object.

Figure 11:
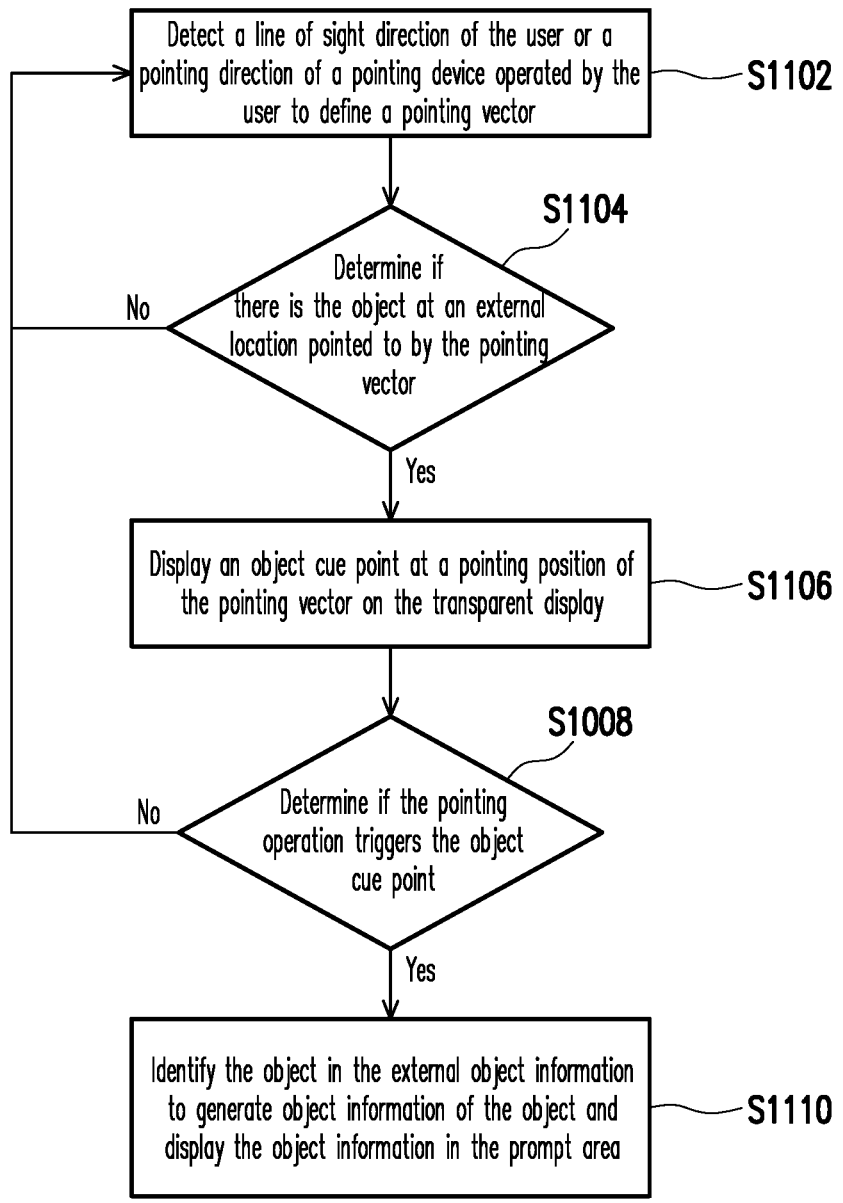
FIG. 11 is a flowchart of an interactive method of virtual and real images according to an embodiment of the disclosure.

FIG. 11 is a flowchart of an interactive method of virtual and real images according to an embodiment of the disclosure. Referring to FIG. 2 and FIG. 11 at the same time, the method of this embodiment may be applied to the interactive apparatus 20 of FIG. 2, and the steps are as follows:

First, the processor 25 may detect a line of sight direction of the user or a pointing direction of a pointing device operated by the user to define a pointing vector (step S1102). Next, the processor 25 may determine whether there is the object at an external location pointed to by the pointing vector on the other side of the transparent display 23 with respect to the user (step S1104). Wherein, if the object is not present at the external location pointed to by the vector, the flow returns to step S1102 to continue detecting and defining the pointing vector.

If the object is present at the external location pointed to by the pointing vector, the processor 25 may display an object cue point at a pointing position of the pointing vector on the transparent display 23 (step S1106), and determine whether the pointing operation of the user triggers the object cue point (step S1108). In determining that the pointing operation of the user does not trigger the object cue point, the flow returns to step S1102 to continue detecting and defining the pointing vector.

In determining that the pointing operation of the user triggers the object cue point and the user wants to interact with the object, processor 25 at this time may identify the object in external object information located on the other side of the transparent display 23 with respect to the user captured by the first information capturing device 22, and generate and display object information of the object in the prompt area on the transparent display 23 (step S1110).

Similar to the embodiment of FIG. 10, in an embodiment, if it is determined in the above step S1108 that the pointing operation of the user does not trigger the object cue point, the processor 25 may additionally determine whether there is prompt information at the trigger location of the pointing operation on the transparent display before performing step S1110. If the prompt information is present, the processor 25 interacts with the user through the prompt information. On the other hand, if the prompt information is not present, the processor 25 identifies the object to generate the object information of the object, and displays the object information in the prompt area on the transparent display 23.

The interactive method and apparatus for virtual and real images according to an embodiment of the disclosure may be used for static objects, dynamic objects, multi-person operation scenarios; detect according to the pointing operation of the users' line of sight, the pointing devices, the gestures, etc.; track the triggering behavior on the transparent display, the object of the user interacting behavior is presumption and the corresponding mode of interaction is carried out. Thereby, not only may the interactive operation of the user be correctly reflected, but also preventing the user from being confused with the information displayed on the transparent display.

Although the disclosure has been disclosed in the above embodiments, it is not intended to limit the disclosure, and those skilled in the art can make a few changes without departing from the spirit and scope of the disclosure. The scope of protection of the disclosure is defined by the scope of the appended claims and their equivalents.

What is claimed is:

1. An interactive method of virtual and real images, comprising the following steps:
detecting, by a processor, a pointing operation of a user on a location of a transparent display, and determining, by the processor, whether the pointing operation triggers the transparent display;
if the transparent display is triggered, determining whether there is a prompt information at said location which is a trigger location of the pointing operation on the transparent display to confirm whether the user wants to interact with the prompt information or interact with an object on another side of the transparent display with respect to the user, wherein the trigger location is a touch position of the user on the transparent display, a position where a line of sight of the user stays on the transparent display, or a location where a pointing device operated by the user points toward on the transparent display;
if the prompt information is present, interacting with the prompt information; and if the prompt information is not present, interacting with the object pointed to by the pointing operation located on the another side of the transparent display with respect to the user.

2. The method according to claim 1, wherein the step of interacting with the object pointed to by the pointing operation located on the other side of the transparent display with respect to the user comprises:
   detecting a coordinate of a face or an eyeball of the user, and defining a pointing vector pointing from the coordinate to the trigger location;
   determining whether there is the object at an external location pointed to by the pointing vector located on the other side of the transparent display with respect to the user; and
   if the object is present, identifying the object to display object information of the object.

3. The method according to claim 1, wherein after the step of interacting with the prompt information, the method further comprises:
   detecting whether the pointing operation repeatedly triggers the transparent display;
   if a repeated trigger is not detected, terminating the interaction after a preset time elapses;
   if a repeated trigger is detected, determining whether the trigger location of the pointing operation on the transparent display is within an interactive prompt area;
   if in the prompt area, updating the interaction; and
   if not in the prompt area, terminating the interaction.

4. The method according to claim 1, wherein before the step of detecting the pointing operation of the user on the transparent display, the method further comprises:
   pre-identifying the object of an external object information located on the other side of the transparent display with respect to the user captured by a first information capture device to generate object information of the object and store the object information in a database.

5. The method according claim 1, wherein the step of detecting the pointing operation of the user on the transparent display comprises:
   detecting a direction of the line of sight of the user or a pointing direction of the pointing device operated by the user to define a pointing vector;
   determining whether there is the object at an external location pointed to by the pointing vector on the other side of the transparent display with respect to the user; and
   if the object is present, pre-identifying the object of an external object information located on the other side of the transparent display with respect to the user captured by a first information capturing device to generate the object information of the object and store the object information of the object in a database.

6. The method according to claim 5, wherein the step of interacting with the object pointed to by the pointing operation located on the other side of the transparent display comprises:
   reading the object information of the object stored in the database, and displaying the object information in a prompt area.

7. The method according to claim 5, wherein after the step of interacting with the prompt information, the method further comprises:
   tracking the pointing vector and determining whether the pointing vector follows a text reading direction of interactive information generated by the interaction;
   if the pointing vector follows the text reading direction of the interactive information, determining whether the pointing operation triggers the transparent display to determine whether to update the interactive information;
   if the pointing vector does not follow the text reading direction of the interactive information, determining whether the pointing operation follows a moving direction of the object;
   if the pointing vector follows the moving direction of the object, reading the object information of the object stored in the database and displaying the object information in the prompt area; and
   if the pointing vector does not follow the moving direction of the object, terminating the interaction after a preset time elapses.

8. The method according to claim 5, further comprising:
   detecting a pointing operation of another user on the transparent display, and determining whether the pointing operation triggers the transparent display;
   if the transparent display is triggered, determining whether there is prompt information corresponding to the pointing operation of the user at a trigger location of the pointing operation on the transparent display;
   if the prompt information is not present, interacting with the object pointed to by the pointing operation located on another side of the transparent display with respect to the user; and
   if the prompt information is present, tracking a pointing vector of the user and determining whether to display object information of the object pointed to by the pointing vector according to whether the pointing vector follows a text reading direction of the prompt information or along a moving direction of the object.

9. The method according to claim 5, wherein pre-identifying the object of the external object information located on the other side of the transparent display with respect to the user captured by the first information capturing device, after the step of generating the object information of the object and storing the object information in the database, the method further comprises:
   displaying an object cue point at a pointing position of the pointing vector on the transparent display;
   determining whether the pointing operation triggers the object cue point; and
   if the pointing operation triggers the object cue point, reading the object information of the object stored in the database, and displaying the object information in a prompt area.

10. The method according to claim 9, wherein the method further comprises: if the pointing operation triggers the object cue point, the method further comprises:
    determining, by the pointing operation, whether the prompt information is present at the trigger location of the pointing operation on the transparent display;
    if the prompt information is present, interacting with the prompt information; and
    if the prompt information is not present, reading the object information of the object stored in the database, and displaying the object information in the prompt area.

11. The method according to claim 1, further comprising:
    detecting a direction of the line of sight of the user or a pointing direction of a pointing device operated by the user to define a pointing vector;
    determining whether there is the object at an external location pointed to by the pointing vector on the other side of the transparent display with respect to the user;

if the object is present, displaying an object cue point at a pointing position of the pointing vector on the transparent display;
determining whether the pointing operation triggers the object cue point; and
if the pointing operation triggers the object cue point, identifying the object of an external object information located on the other side of the transparent display with respect to the user captured by a first information capturing device to generate object information of the object and to display the object information in a prompt area.

12. The method according to claim 11, wherein the method further comprises: if the pointing operation triggers the object cue point, the method further comprises:
determining, by the pointing operation, whether the prompt information is present at the trigger location on the transparent display;
if the prompt information is present, interacting with the prompt information; and
if the prompt information is not present, identifying the object of the external object information located on the other side of the transparent display with respect to the user captured by the first information capturing device to generate the object information of the object and to display the object information in the prompt area.

13. An interactive apparatus for virtual and real images, comprising:
a transparent display;
a first information capturing device, capturing an external object information on another side of the transparent display with respect to a user viewing the transparent display;
a second information capturing device, capturing information of the user; and
a processor, coupled to the transparent display, the first information capturing device, and the second information capturing device, loading and executing a plurality of program commands to:
using the information of the user to detect a pointing operation of the user on the transparent display, and determining whether the pointing operation triggers the transparent display;
if the transparent display is triggered, determining whether there is a prompt information at said location which is a trigger location of the pointing operation on the transparent display to confirm whether the user wants to interact with the prompt information or interact with an object on the another side of the transparent display with respect to the user, wherein the trigger location is a touch position of the user on the transparent display, a position where a line of sight of the user stays on the transparent display, or a location where a pointing device operated by the user points toward on the transparent display;
if the prompt information is present, interacting with the user and the prompt information; and
if the prompt information is not present, interacting with the object pointed to by the pointing operation located on the other side of the transparent display with respect to the user.

14. The interactive apparatus of claim 13, wherein the processor comprises:
detecting a coordinate of a face or an eyeball of the user, and defining a pointing vector pointed from the coordinate to the trigger location;
determining whether there is the object at an external location pointed to by the pointing vector located on the other side of the transparent display with respect to the user; and
if the object is present, identifying the object to display object information of the object.

15. The interactive apparatus of claim 13, wherein the processor further comprises:
detecting whether the pointing operation repeatedly triggers the transparent display;
if a repeated trigger is not detected, terminating the interaction after a preset time elapses;
if the repeated trigger is detected, determining whether the trigger location of the pointing operation on the transparent display is within an interactive prompt area;
if in the prompt area, updating the interaction; and
if not in the prompt area, terminating the interaction.

16. The interactive apparatus according to claim 13, wherein the processor comprises:
detecting a direction of the line of sight of the user or a pointing direction of the pointing device operated by the user to define a pointing vector;
determining whether there is the object at an external location pointed to by the pointing vector on the other side of the transparent display with respect to the user; and
if the object is present, pre-identifying the object of the external object information located on the other side of the transparent display with respect to the user captured by a first information capturing device to generate object information of the object and store the object information of the object in a database, wherein
when displaying interactive information of the object pointed to by the pointing operation located on the other side of the transparent display with respect to the user, the processor comprises reading the object information of the object stored in the database, and displaying the object information in a prompt area.

17. The interactive apparatus according to claim 16, wherein after interacting with the prompt information, the processor further comprises:
tracking the pointing vector, and determining whether the pointing vector follows a text reading direction of the interactive information generated by the interaction;
if the pointing vector follows the text reading direction of the interactive information, determining whether the pointing operation triggers the transparent display to determine whether to update the interactive information;
if the pointing vector does not follow the text reading direction of the interactive information, determining whether the pointing operation follows a moving direction of the object;
if the pointing vector follows the moving direction of the object, reading the object information of the object stored in the database, and displaying the object information in the prompt area; and
if the pointing vector does not follow the moving direction of the object, terminating the interaction after a preset time elapses.

18. The interactive apparatus according to claim 16, wherein the processor further comprises:
detecting a pointing operation of another user on the transparent display, and determining whether the pointing operation triggers the transparent display;
if the transparent display is triggered, determining whether prompt information corresponding to the pointing operation of the user is present at a trigger location of the pointing operation on the transparent display;

if the prompt information is not present, interacting with an object pointed to by the pointing operation located on another side of the transparent display with respect to the user; and if the prompt information is present, tracking a pointing vector of the user, and determining whether to display object information of the object pointed to by the pointing vector according to whether the pointing vector follows a text reading direction of the prompt information or along a moving direction of the object.

19. The interactive apparatus according to claim 16, wherein the processor further comprises:

displaying an object cue point at a pointing position of the pointing vector on the transparent display;

determining whether the pointing operation triggers the object cue point; and if the pointing operation triggers the object cue point, identifying the object of the external object information located on the other side of the transparent display with respect to the user captured by the first information capturing device to generate the object information of the object and to display the object information in the prompt area.

20. The interactive apparatus according to claim 19, wherein if the pointing operation triggers the object cue point, the method further comprises:

determining, by the pointing operation, whether the prompt information is present at the trigger location on the transparent display;

if the prompt information is present, interacting with the prompt information; and if the prompt information is not present, identifying the object of the external object information located on the other side of the transparent display with respect to the user captured by the first information capturing device to generate the object information of the object and to display the object information in the prompt area.

* * * * *